Figure 1:
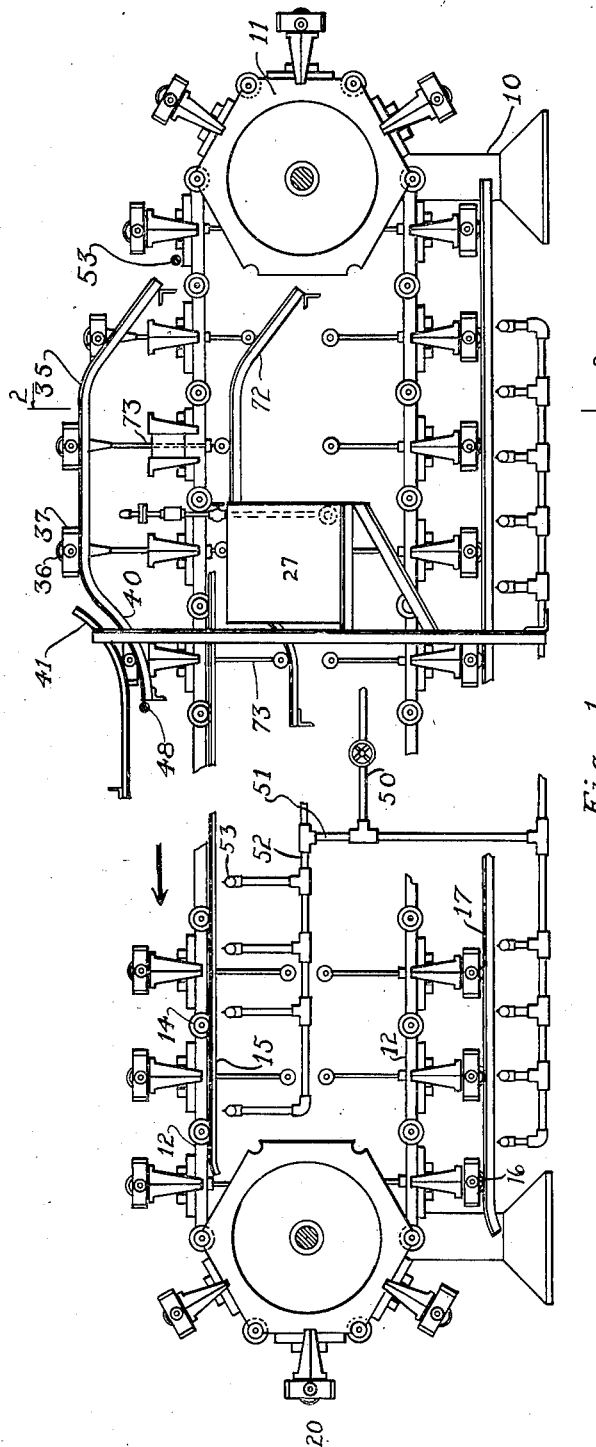

Nov. 6, 1934.    J. P. GROSET ET AL    1,979,259
MACHINE FOR MAKING ICE CREAM CONES AND THE LIKE
Filed Dec. 11, 1933    4 Sheets-Sheet 1

INVENTORS
John P. Groset
Christ J. Halset
BY E. J. Andrews
ATTORNEY

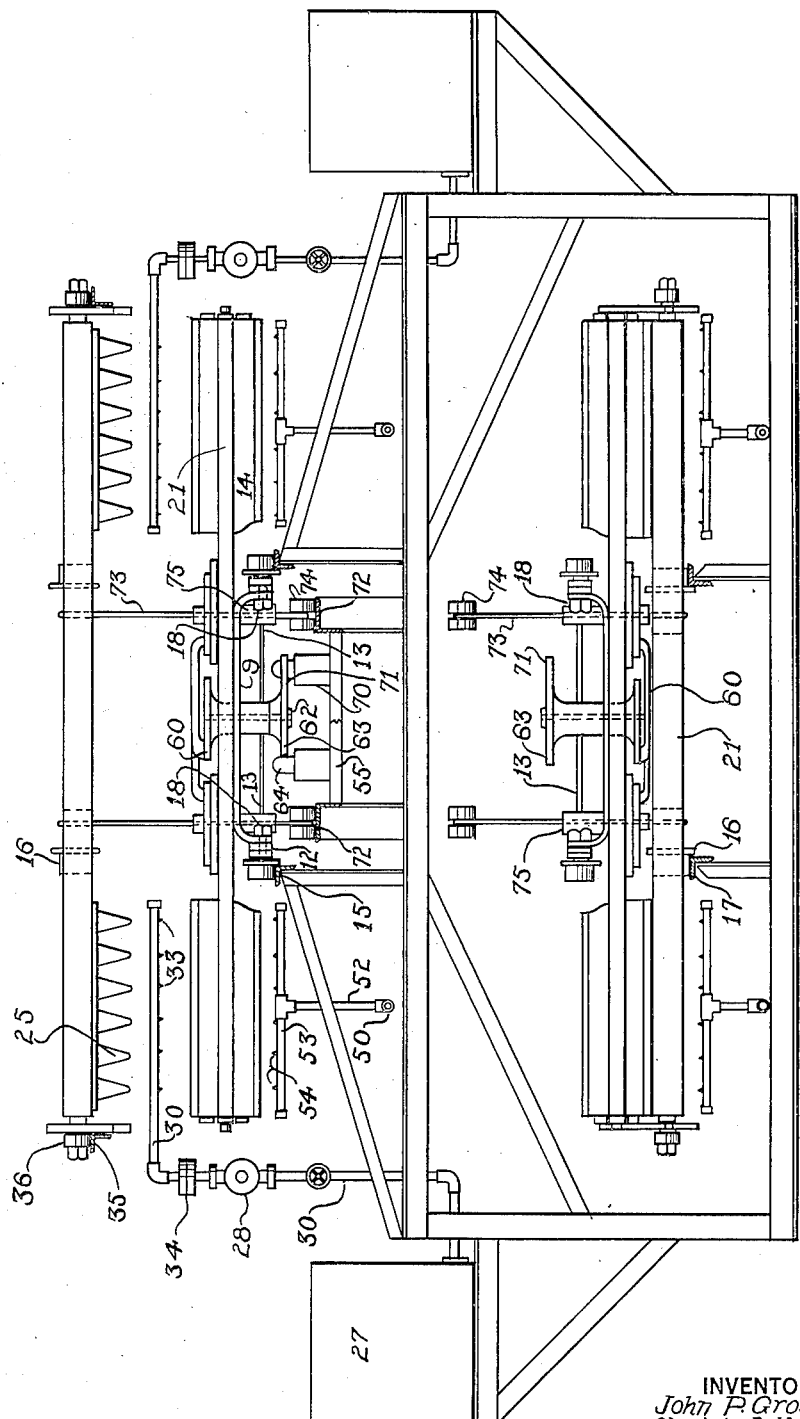

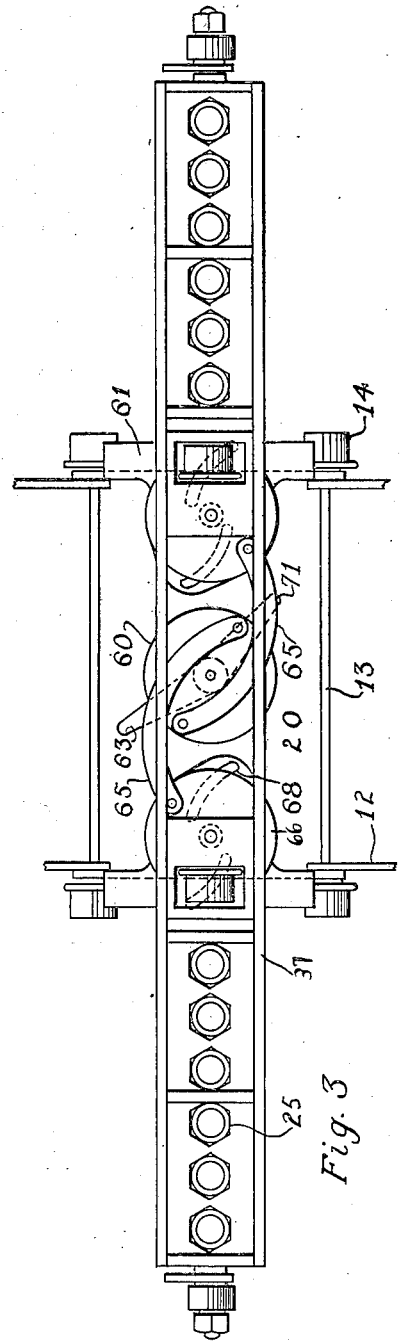
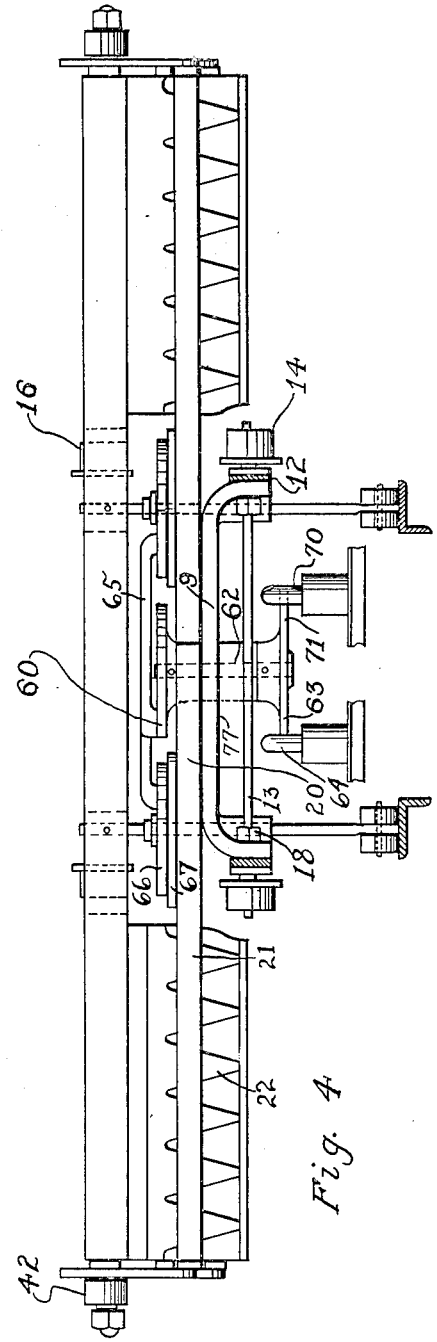

Nov. 6, 1934.   J. P. GROSET ET AL   1,979,259
MACHINE FOR MAKING ICE CREAM CONES AND THE LIKE
Filed Dec. 11, 1933   4 Sheets-Sheet 4
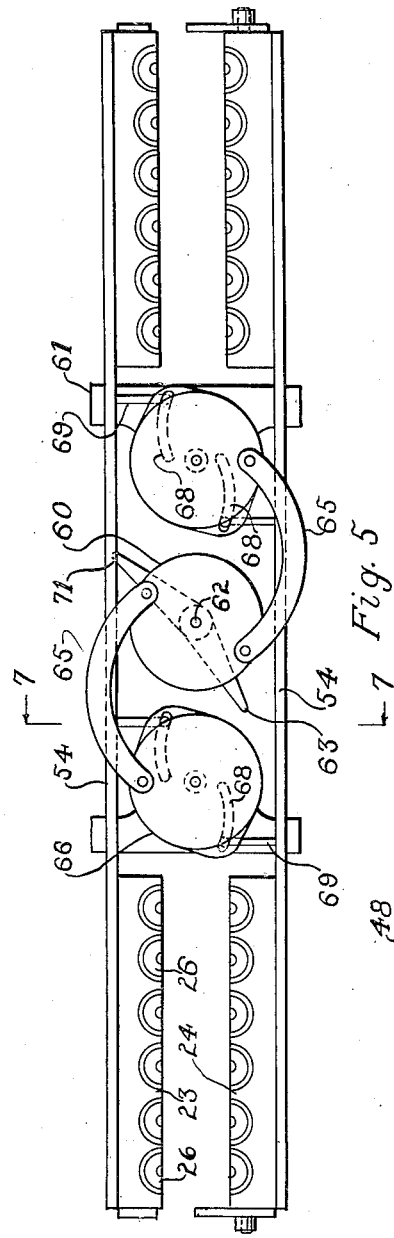
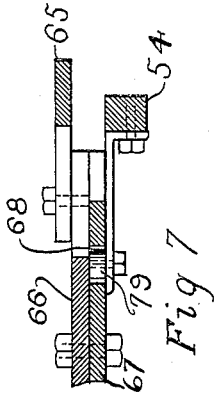
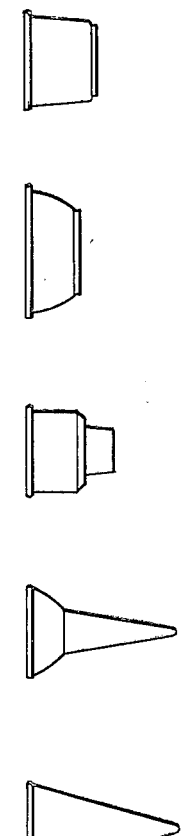
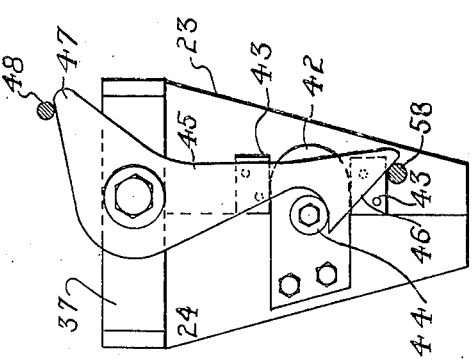
INVENTORS
John P. Groset
Christ J. Halset
BY
ATTORNEY Patented Nov. 6, 1934

1,979,259

UNITED STATES PATENT OFFICE 1,979,259

MACHINE FOR MAKING ICE-CREAM CONES AND THE LIKE

John P. Groset and Christ J. Halset, Chicago, Ill., assignors to Ideal Machine Company, Chicago, Ill., a corporation of Illinois Application December 11, 1933, Serial No. 701,926

9 Claims. (Cl. 107—58)

This invention relates to machines for making ice-cream cones, other pastry products, and the like. It has for one of its objects providing a machine of this nature that it is operated by chain belts along horizontal paths. Another object is to provide a double system; that is, the machine has two systems of molds operating parallel with each other, arranged so that either system or both may be used if desired; and each of the systems is composed of a series of independent units, arranged so that any of the units may be removed without interfering with the operation of the other units. Another object is to provide for opening and closing corresponding molds in the two systems simultaneously and in an improved manner. Other objects of the invention will be apparent from a consideration of the accompanying drawings and the following description thereof:

Of the drawings, Fig. 1 is an elevation of a machine which embodies the features of our invention, showing only general features without much detail; Fig. 2 is an enlarged view along the line 2—2 of Fig. 1; Fig. 3 is an enlarged plan view of one of the units of the system; Fig. 4 is an elevation of the unit shown in Fig. 3; Fig. 5 is a plan view of the molds of the units and the means for separating the sections of the molds; Fig. 6 is an enlarged end view of one of the units; Fig. 7 is a fractional sectional view of a portion of the means for separating the sections; and Fig. 8 illustrates various types of cones and other pastry which may be formed in the machine.

This application is a continuation in part of applicant's copending case, Serial No. 507,800, filed January 10, 1931.

The machine comprises a frame 10, Fig. 1, on each end of which are rotatably mounted two chain belt pulleys 11, by means of which are operated the chain belts 12. The belts are connected by rods 13, Fig. 2. The pulleys 11 are operated by any suitable means. The upper sides of the belts as they are rotated are supported by means of rollers 14 on rails 15; and the lower sides of the belts are supported on the rollers 16 and rails 17.

The machine comprises also a plurality of units 20, as shown in Figs. 3 and 4. The units are independent of each other, except as they are associated with the chain belt, and any unit may be removed without interfering with the operation of the other units. This is accomplished by merely removing the bolts 18 which connect the bars 19 of the units with the links of the belt 12. These units, as indicated, extend transversely of the chain belts and each comprises a frame 21 adjacent the ends of which are mounted the molds 22. In this instance, we have shown six molds in each set, but the exact number of molds is not a feature of our invention. Each mold unit comprises a matrix consisting of two separable sections 23 and 24. When these sections are closed, six mold cavities 26 are formed, into which the batter is passed. The unit comprises also cores 25 which are arranged to pass into the mold cavities 26 when the matrices are closed. The matrices are opened and closed by suitable mechanism during the normal operation of the machine at proper times, and the cores are raised and lowered suitably by means hereinafter described.

In operation, the units travel along the rails in the direction of the arrow, and when they reach a position opposite the batter tank 27, the batter is forced, by means of a pump, from the tank into the mold cavities, it being understood that the matrices are then closed. Connected to the lower portion of the tank is a pipe 30, and in this pipe is mounted the pump 28, the pump being of any suitable nature and operated in any suitable manner. As the pump is operated, the batter is forced out of the nozzles 33. In normal operation, the batter is intermittently forced out of the nozzles 33 into the various cavities as they are passed along under the nozzles. Connected to the pipe 30 is a rotatable joint 34, by means of which the nozzles can be swung away from over the molds, so as to avoid any baking of the batter in the pipe or nozzles when the nozzles are not in use.

In operation, as the molds move along beneath the nozzles 33, sufficient batter is inserted for the formation of the cones desired. As the molds move onwardly from the nozzles, in the direction of the arrow (Fig. 1), the cores are allowed to move downwardly and to pass into the cavities of the molds. As the cavities are being filled, the cores are supported by rails 35 on which rest rollers 36 rotatably mounted on the core frames 37. As the molds and cores pass onwardly, the rollers 36 pass down the inclines 40 and the cores are thus allowed to pass into the cavities. To assist in this, a rail 41 is provided, which is arranged to coact with the rollers 36 on the ends of the core frames and force the cores down into the mold cavities.

As soon as the cores are passed into the cavities, the frame of the molds is locked to the core frame. For this purpose, we prefer the mechanism shown in Fig. 6. When the two mold sections 23 and 24 are forced together in the manner hereinafter described, a tongue 42, fixed to one section, passes between guide members 43, fixed to the other section, so as to force the molds to register properly as they are brought together. Rotatably mounted on the tongue is a roller 44, and pivoted to the core frame 37 is a hook 45. This hook is so shaped and arranged that, as the core frame passes downwardly, the surface 46 of the hook will coact with the roller 44 and force the hook to the right and, when the cores are forced sufficiently into the cavities, the arm 47, coacting with the pin 48, will force the hook under the roller 44 and, thus, will clamp the two frames rigidly together. The pin 48 is fixed to the frame of the machine at a position suitable for operating the hook at the proper time.

The means which we provide for baking the batter comprises a supply pipe 50 suitably connected to any suitable source of gas supply, and branch pipes 51, to which are connected the pipes 52 leading to the jet pipes 53. The jet pipes have six jets 54 which are mounted so as to be positioned immediately below the respective molds as the molds move along. A similar system of pipes is provided for the lower portion of the machine, so that, when the molds and cores are inverted, moving along the rail 17, the batter will continue to be baked. After the batter has been baked, the units are elevated by the chain belt, and the hook 45 comes in contact with a pin 58 suitably positioned and fixed to the frame of the machine, and the hook is forced off from the roller 44. Suitable mechanism then separates the mold sections as the cores are elevated therefrom, and the baked cones drop from the cores and are collected in any suitable manner.

The mechanism for separating the sections of the molds is arranged to separate both sections of the units simultaneously. The beams 54 extend from one end of the unit to the other on each side, and each section of the mold matrices is fixed to one end of these beams. Between the two beams 54 is a disk 60 rotatably mounted on the supporting frame 55, and fixed thereto is a shaft 62. On the lower end of this shaft is fixed an arm 63. When the molds reach the position where they are to be opened, the arm 63 comes in contact with a pin 64 fixed to the frame, and the arm 63 is rocked, thus rocking the shaft 62 and the disk 60. Pivoted to the disk 60 are links 65. The links are also pivoted to disks 66 and, as the disk 60 is rotated, the disks 66 are also rotated by the links. Fixed to each of the disks 66 is a disk 67, and each disk 67 is supplied with grooves 68 in which are mounted rollers 79. These rollers are fixed to the beams 54 and, as the disks rotate, carrying with them the grooves, the rollers are forced outwardly to the position indicated in Fig. 5, carrying with them the mold sections.

When the units pass onwardly, a pin 70 also fixed to the frame 55 comes in contact with the arm 71, also fixed to the shaft 62, and the disk 60 is thus rotated backwardly, carrying with it the link 65 and rotating the disks 66 and 67 to force the rollers 79 inwardly and close the mold sections.

The links 65 are positioned and shaped so that the sections are locked together by the links when the disks are rotated to that end. The pivots of one link are so placed that a line drawn through their centers will pass outside of the adjacent pivot of the other link, thus holding the sections together until the disks are again rotated.

In order to assist in elevating the core blocks, a rail 72 is provided, and the two rods 73 are slidably mounted on the core frame member 75. Mounted on the outer end of each rod is a roller 74 which coacts with the rail 72 and assists in forcing upwardly the mold blocks at the proper time. The rail 72 also assists in lowering the mold blocks when the cores are to be passed into the molds.

We claim as our invention:

1. An ice-cream cone machine comprising a frame, a plurality of mold supports movably mounted on said frame, means for moving said supports longitudinally of said frame, a set of matrices for molding cones mounted outwardly from said frame on each end of each of said supports, each of said sets having a plurality of cone molding cavities therein; a plurality of cores, and means for passing said cores into and out of the respective cavities, said cavities being positioned in rows running transversely of said path of motion.

2. An ice-cream cone machine as claimed in claim 1, in which said latter means comprises a bar extending across said frame and mounted for vertical movement thereon, said cores being fixed with reference to said bar, and means for elevating and lowering said bar.

3. An ice-cream cone machine as claimed in claim 1, in which said latter means comprises a bar extending across said frame and being mounted for vertical movement thereon, said cores being fixed with reference to said bar, and means for elevating and lowering said bar, said elevating means comprising a roller fixed with reference to each end of said bar, and an inclined track for supporting said rollers.

4. An ice-cream cone machine as claimed in claim 1, in which said latter means comprises a bar extending across said frame and being mounted for vertical movement thereon, said cores being fixed with reference to said bar, slidably mounted rods extending downwardly from said bar, a roller on the lower end of each rod, and an inclined track for supporting said rollers.

5. An ice-cream cone machine as claimed in claim 1, in which said latter means comprises a bar extending across said frame and being mounted for vertical movement thereon, said cores being fixed with reference to said bar, said latter means comprising a roller fixed with reference to each end of said bar, an inclined track for supporting said rollers, and including also slidably mounted rods extending downwardly from said bar, a roller on the lower end of each rod, and an inclined track for supporting said rollers.

6. An ice-cream cone machine as claimed in claim 1, in which said latter means comprises a bar extending across said frame and being mounted for vertical movement thereon, said cores being fixed with reference to said bar, means for elevating and lowering said bar, said elevating means comprising a roller fixed with reference to each end of said bar, an inclined track for supporting said rollers, and a second inclined track mounted over said first-mentioned track, and adapted to force downwardly said rollers and force the cores into said cavities.

7. An ice-cream cone machine comprising a frame, a plurality of mold supports movably mounted on said frame, means for moving said supports longitudinally of said frame, matrices for molding cones mounted on each of said supports on each side of the path of motion thereof, each of said supports comprising two beams, one being movable, each of said matrices comprising two sections, one being fixed to the movable beam, and means for moving said movable beam, said latter means comprising a member mounted for rocking, a link eccentrically pivoted to said member, said link being pivoted also to a rotatable member having a slot therein, a roller fixed with reference to one of said movable beams and coacting with said slot, and means for rocking said first-mentioned member.

8. An ice-cream cone machine as claimed in claim 7, in which said rocking means comprises arms fixed with reference to said rocking member, and stops fixed to said frame for coacting with said arms to rock said member as the supports move.

9. An ice-cream cone machine comprising a frame, a mold, a support therefor comprising two relatively movable sections, a core adapted to coact with said mold, means for passing said core into and out of said mold, means for locking said core in said mold, said means comprising a roller fixed with reference to one of said sections, a hook rotatably associated with said mold, arms fixed to said hook, stops fixed to said frame and adapted to coact with said arms to hook and unhook said hook with reference to said roller, and means for registering said sections when they are moved relatively, one member of said registering means being fixed with reference to one section, and said roller being mounted on said member.

JOHN P. GROSET.
CHRIST J. HALSET.